United States Patent
Liu et al.

(10) Patent No.: US 11,201,894 B2
(45) Date of Patent: Dec. 14, 2021

(54) METHOD, SYSTEM, AND COMPUTER PROGRAM PRODUCT FOR AUTOMATICALLY MITIGATING VULNERABILITIES IN SOURCE CODE

(71) Applicant: Lucent Sky Corporation, San Francisco, CA (US)

(72) Inventors: Jim Liu, Taipei (TW); Yi-Chia Huang, Taipei (TW)

(73) Assignee: Lucent Sky Corporation, San Francisco, CA (US)

( * ) Notice: Subject to any disclaimer, the term of this patent is extended or adjusted under 35 U.S.C. 154(b) by 0 days.

(21) Appl. No.: 16/819,186

(22) Filed: Mar. 16, 2020

(65) Prior Publication Data

US 2020/0220894 A1 Jul. 9, 2020

Related U.S. Application Data

(63) Continuation-in-part of application No. 16/027,383, filed on Jul. 5, 2018, now Pat. No. 10,630,714, which is a continuation-in-part of application No. 15/465,603, filed on Mar. 22, 2017, now Pat. No. 10,044,747, which is a continuation of application No. 14/845,281, filed on Sep. 4, 2015, now Pat. No. 9,639,703, which is a continuation of application No. 13/905,096, filed on May 29, 2013, now Pat. No. 9,158,922.

(51) Int. Cl.
*H04L 29/06* (2006.01)
*G06F 8/41* (2018.01)
*G06F 21/53* (2013.01)
*G06F 21/57* (2013.01)

(52) U.S. Cl.
CPC ............ *H04L 63/1433* (2013.01); *G06F 8/41* (2013.01); *G06F 8/42* (2013.01); *G06F 8/43* (2013.01); *G06F 21/53* (2013.01); *G06F 21/577* (2013.01); *H04L 63/14* (2013.01); *H04L 63/1425* (2013.01); *H04L 63/1466* (2013.01); *G06F 2221/033* (2013.01)

(58) Field of Classification Search
CPC .... G06F 11/3466; G06F 11/3672; G06F 8/41; G06F 8/433; G06F 9/45516; G06F 21/577; G06F 11/3612; G06F 21/53; G06F 2221/033; H04L 63/14; H04L 63/1425; H04L 63/1466; H04L 63/1433
See application file for complete search history.

(56) References Cited

U.S. PATENT DOCUMENTS

2013/0179978 A1* 7/2013 Pistoia .................... G06F 21/50
726/25

FOREIGN PATENT DOCUMENTS

WO WO 2014/041561 * 3/2014 ............. G06F 21/00

* cited by examiner

*Primary Examiner* — Paul E Callahan
(74) *Attorney, Agent, or Firm* — JCIPRNET

(57) ABSTRACT

A method, a system, and a computer program product for automatically mitigating vulnerabilities in a source code of an application are provided. The method includes the following steps. First, a path graph is built according to the source code, where the path graph includes multiple paths, and each of the paths includes multiple nodes. Multiple tainted paths are identified, where each of the tainted paths corresponds to a vulnerability. A same target node in multiple intersecting tainted paths among the tainted paths is located based on an existence of a tainted object, and multiple vulnerabilities in the target node are mitigated automatically.

11 Claims, 7 Drawing Sheets

METHOD, SYSTEM, AND COMPUTER PROGRAM PRODUCT FOR AUTOMATICALLY MITIGATING VULNERABILITIES IN SOURCE CODE

CROSS-REFERENCE TO RELATED APPLICATION

This application is a continuation-in-part application of and claims the priority benefit of U.S. application Ser. No. 16/027,383, filed on Jul. 5, 2018, now U.S. Pat. No. 10,630, 714 issued Apr. 4, 2020. The prior U.S. application Ser. No. 16/027,383 is a continuation-in-part application of and claims the priority benefit of U.S. application Ser. No. 15/465,603, filed on Mar. 22, 2017, now U.S. Pat. No. 10,044,747 issued Aug. 8, 2018. The prior U.S. application Ser. No. 15/465,603 is a continuation application of and claims the priority benefit of U.S. application Ser. No. 14/845,281, filed on Sep. 4, 2015, now U.S. Pat. No. 9,639,703 issued May 2, 2017. The prior application Ser. No. 14/845,281 is a continuation application of and claims the priority benefit of U.S. application Ser. No. 13/905,096, filed on May 29, 2013, now U.S. Pat. No. 9,158,922 issued Oct. 10, 2015. The entirety of each of the above-mentioned patent applications is hereby incorporated by reference herein and made a part of this specification.

TECHNICAL FIELD

The present invention relates to software security vulnerabilities. More particularly, the present invention relates to comprehensive techniques for automatically mitigating software security vulnerabilities in source code.

BACKGROUND

Businesses rely more and more on the cloud to keep their applications running and data accessible. However, a high percentage of websites have vulnerabilities that may lead to the theft of data such as credit card information and customer lists. Business needs application security solutions to avoid business interruptions and costly lawsuits. The software developers have historically focused on security vulnerabilities and other serious functionality issues in the software that may be exploited by hackers. Despite the efforts, the security vulnerabilities remain as serious threats in the application level.

Various methods have been developed to identify security vulnerabilities in applications, such as black-box testing and static code analysis. Static code analysis is used by the software developers to analyze software for problems and inconsistencies before actually compiling the source code and executing programs built from the code for the software, and such technique is aimed at locating and describing areas of security vulnerabilities in the source code. Most high-level optimizations performed by a modern compiler involve static analysis such as code path analysis, which is used to detect the propagation of an object and further validate the legality along a code execution path. Static code analysis is differentiated from dynamic analysis techniques by analyzing the source code for dependencies without relying on dynamic events in a more complete view of every possible execution path rather than some aspects of a necessarily limited observed behavior.

Several existing static code analysis tools are capable of scanning the source code by leveraging predefined security rules such that potential vulnerabilities are detected and reported to the software developers. The vulnerability report may be accompanied by generic remediation criteria, which proposes ways in which the software developers can amend the source code so as to mitigate the reported vulnerabilities. Nonetheless, the software developers still need to implement and validate the problematic source code manually, which may be labor-intensive in consideration of a large amount of existing applications. Due to lack of time or resources, many stakeholders are forced to deploy the applications even knowing they have potential security issues.

SUMMARY

The present invention provides a method, a system and a computer program product, which are capable of effectively mitigating vulnerabilities in a source code.

According to one of exemplary embodiments, the method includes the following steps. First, a path graph is built according to the source code, where the path graph includes multiple paths, and each of the paths includes multiple nodes. Multiple tainted paths are identified, where each of the tainted paths corresponds to a vulnerability. A same target node in multiple intersecting tainted paths among the tainted paths is located based on an existence of a tainted object, and multiple vulnerabilities in the target node are mitigated automatically.

According to one of exemplary embodiments, the system includes a memory and a processor coupled thereto. The processor is configured to: build a path graph according to the source code, where the path graph includes multiple paths, and each of the paths includes multiple nodes; identify multiple tainted paths from the path graph, where each of the tainted paths corresponds to a vulnerability; locate a same target node in a plurality of intersecting tainted paths among the tainted paths based on an existence of a tainted object; and mitigate multiple vulnerabilities in the target node automatically.

According to one of exemplary embodiments, the computer program product is a non-transitory computer-readable medium including program instructions. When the program instructions are executed by a computer system, the computer system is caused to execute the aforesaid method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
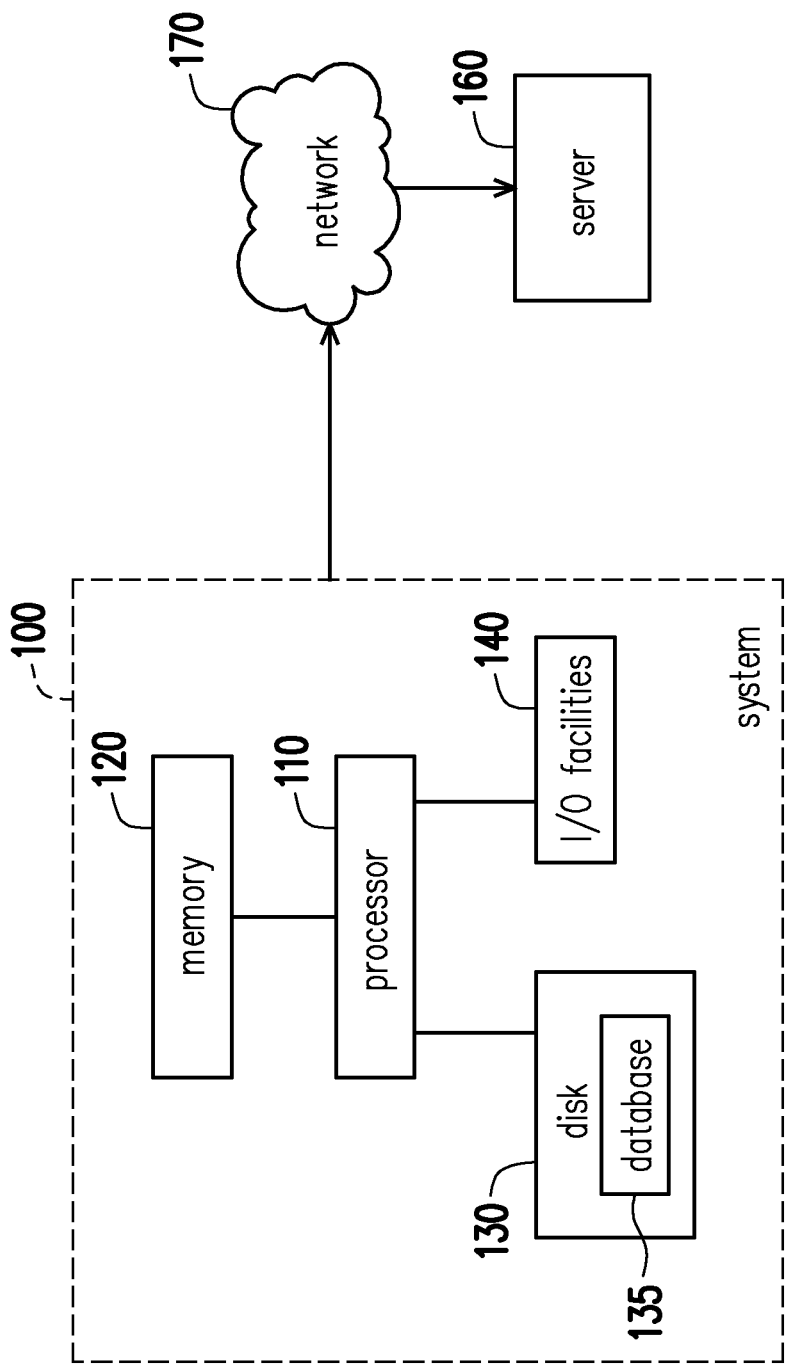
FIG. 1 is a system for automatically mitigating vulnerabilities in a source code according to an exemplary embodiment of the present invention.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1 is a system for automatically mitigating vulnerabilities in a source code according to an exemplary embodiment of the present invention.

Referring to FIG. 1, a system 100 may be a personal computer, an embedded computer, a smart phone, a laptop computer, a tabular computer or other devices capable of performing the functions described in the present invention. The system 100 includes a processor 110, a memory 120, a disk 130, and input/output (I/O) facilities 140. The processor 110 is coupled to the memory 120, the disk 130, and the I/O facilities. The processor 110 may be a single chip or a multiple processor unit and may include associated peripheral chips or functional blocks. The primary function of the processor 110 is to execute program instructions by performing operations on data. The memory 120 may be a volatile or non-volatile memory known to those skilled in the art including, for example, a random access memory (RAM), a static random access memory (SRAM), or a dynamic random access memory (RAM). The disk 130 may be a hard disk drive (HDD) or a solid state drive (SSD) and is configured for storing and retrieving files. For example, the disk 130 may include computer program products such as in the form of programming code, routines, or instruction blocks that provide a specific set or sets of ordered operations that control the functionality of the hardware and direct its operation to perform some features or functionality of the system 100 once the instructions are loaded into the memory 120 and executed by the processor 110. The disk 130 may also include a database 135, which may be implemented as any type of data storage structure capable of providing for the retrieval and storage of a variety of data types. The I/O facilities 140 may include an interface for a monitor, a keyboard, a joystick, a mouse, a pointing device, a speech-based interaction device or the like. Additionally, in another exemplary embodiment, the system 100 may further include other standard peripheral components (not shown).

In one of exemplary embodiments, the system 100 may be viewed as a client computer and connects to a server 160 via a network 170. The network 170 may be a computer network such as a local area network (LAN), wide area network (WAN), the Internet, or a cellular network. The server 160 may represent various forms of servers including, but not limited to a web server, an application server, or a network server. For example, the server 160 may be an application server that executes software accessed by the system 100. A user may invoke applications available on the server 160 in a web browser running on the system 100.

The application software hosted by the server 160 may exhibit various security vulnerabilities. For example, the application software may include vulnerable data and control flow patterns that enable hackers to force the software to perform unintended actions. An example of such problem is called a structured query language (SQL) injection, which occurs when untrusted data makes its way through an application and eventually becomes a part of an SQL query. The hackers may first identify the flow of untrusted data from its entry point, referred to as a "source," to a vulnerable Application Programming Interface (API), referred to as a "sink." For example, the source of a security vulnerability may be an injection of untrusted data in the parameter of a HyperText Transfer Protocol (HTTP) request, and the sink of a security vulnerability may be the process of data modification to manipulate the behavior of the application, such as a HyperText Markup Language (HTML) page. The hackers may manipulate the input data to change the meaning of the SQL query and cause significant harm to the repository resources such as a database system by simple assignments, method calls, or parameters passing. In other words, the hackers may inject an SQL statement into an existing SQL statement, causing the execution of the SQL statement, which is not expected by the application, to manipulate the database system in an unauthorized manner. Other known vulnerabilities, such as operating system (OS) command injection, lightweight directory access protocol (LDAP) injection, extensible markup language (XML) injection, XML path language (XPath) injection, cross-site scripting (XSS), weak cryptography, insecure redirect, error triggering sensitive information leak, session hijacking, security misconfiguration, and weak authentication, are also often exploited by hackers and would be apparent to one of ordinary skill in the art.

Figure 2:
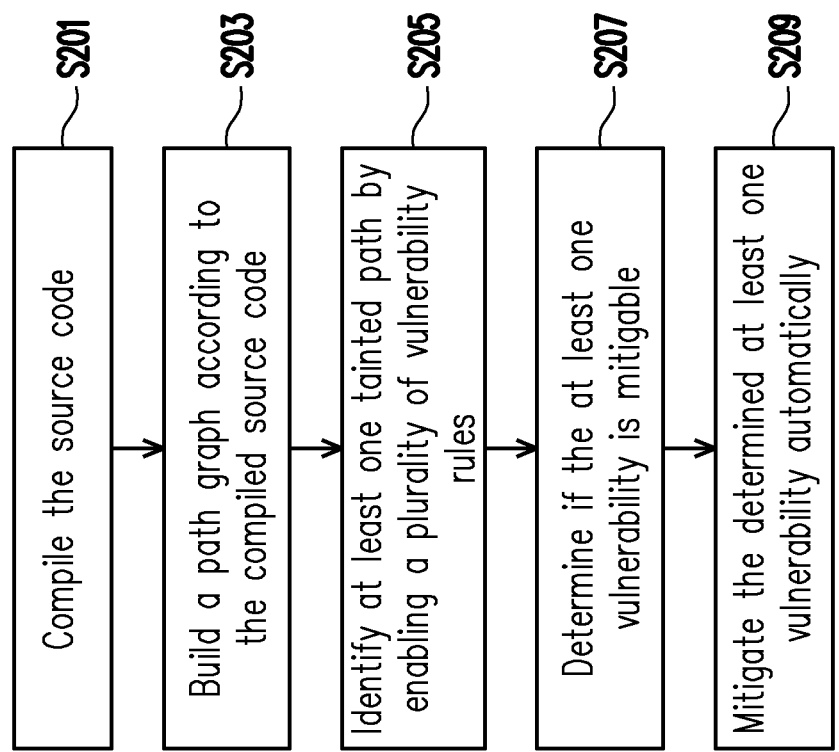
FIG. 2 is a flowchart illustrating a method for automatically mitigating vulnerabilities in source code according to an embodiment of the present invention.

FIG. 2 is a flowchart illustrating a method for automatically mitigating vulnerabilities in source code according to an embodiment of the present invention.

In the present embodiment, source code of an application may be any software code written in one or more programming languages including compiled languages such as C/C++, Java, Python, Perl, Ruby, PHP, Linux/UNIX shell script as well as interpreted languages such as assembly code, byte code, or instructions. Source code may be a fully functional program or a subset of a program such as a command, function, method, class, library, or any code segment. Source code may also reference outside classes, objects, files, libraries or APIs.

Referring to FIG. 2 along with the components in FIG. 1, the method for automatically mitigating vulnerabilities in source code including the following steps. First, the processor 110 compiles the source code (Step S201) and builds a path graph according to the compiled source code (Step S203). Next, the processor 110 searches for at least one vulnerability within the source code (Step S205). To be more specific, after the processor 110 obtains the source code of an application, it may compile the source code and builds a path graph according to the compiled source code. Such path graph includes a plurality of paths traversing from sources to sinks, and each of the paths includes a plurality of nodes. The path graph is used to determine those parts of the source code to which a particular value assigned to an object/variable might propagate. The processor 110 then identifies at least one tainted paths by enabling a plurality of vulnerability rules. The term "tainted" used herein refers to data that contains at least some data from an external source that is considered to be untrusted and propagates through, for example, some object/variable assignments to a destination. Therefore, each of the at least one tainted path corresponds to a vulnerability, and each of the at least one vulnerability corresponds to a sanitization method. The at least one tainted paths may be identified by using an existing automated data flow analysis tool to perform data flow analysis on the path graph. For example, theoretically, definite assignment analysis is one of data flow analysis used by C/C++ compilers to conservatively ensure that an object/variable is always assigned to before it is used. Java and C# programming language specifications require their compilers to report a compile-time error if the analysis fails. Also, the existing automated data flow analysis tool may be some open source or free tools such as RIPS (a static source code analyzer for vulnerabilities in PHP web applications), Google CodeSearchDiggity (a tool to identify SQL injections, XSS, hard-coded passwords, etc), or RATS (a tool for scanning C/C++, Perl, PHP, Python source code for vulnerabilities such as buffer overflows), and so on.

Next, the processor 110 determines if the at least one vulnerability is mitigable (Step S207). The at least one vulnerability may be associated with a node on a single tainted path or a node which is an intersection of multiple tainted paths. Therefore, the processor 110 may need to locate the exact position where the sanitization method may be placed so that the determined at least one vulnerability may be mitigated automatically in a precise manner (Step S209).

Figure 3:
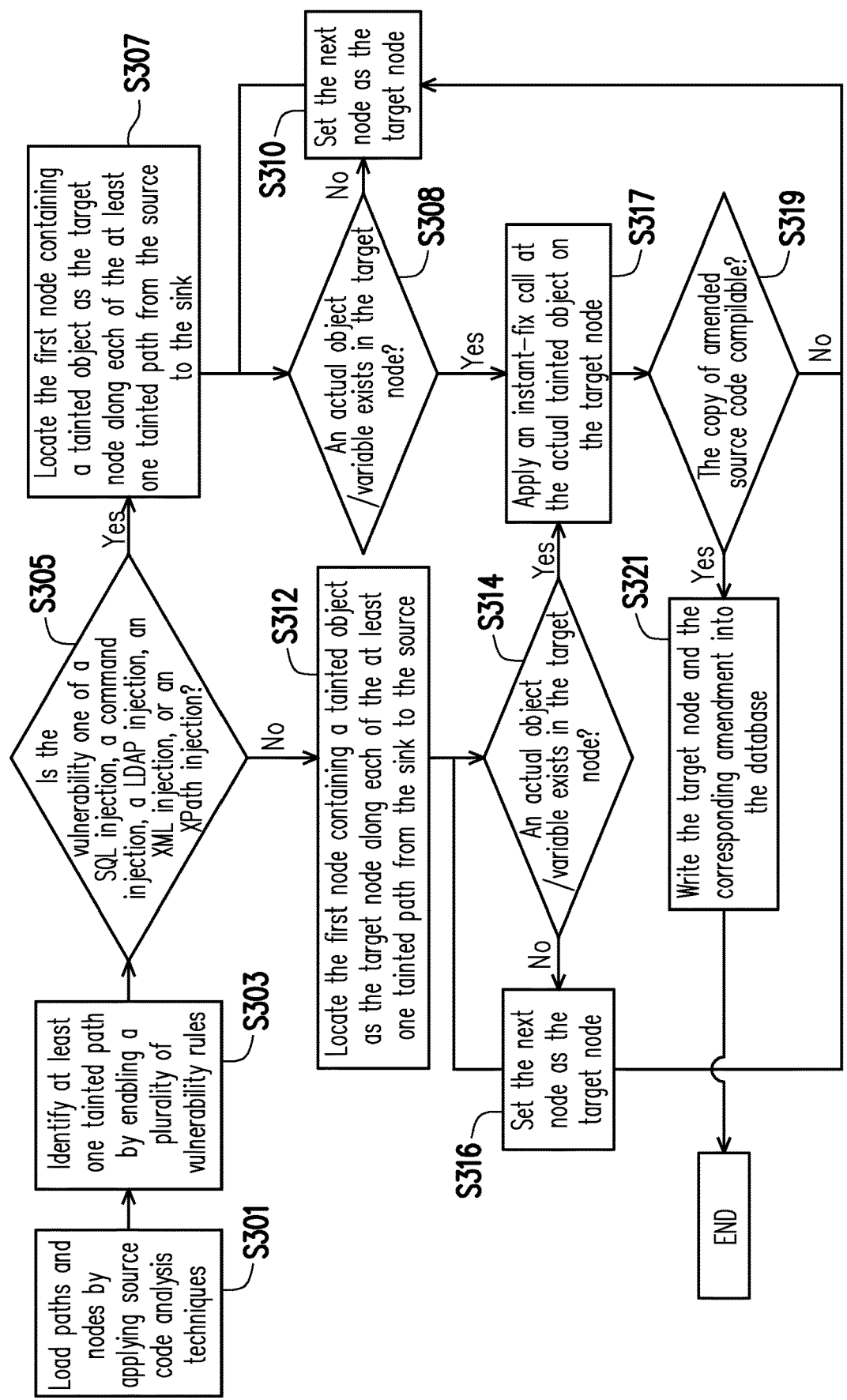
FIG. 3 is a flowchart illustrating an algorithm for automatically mitigating vulnerabilities in source code according to an embodiment of the present invention.

FIG. 3 is a flowchart illustrating an algorithm for automatically vulnerabilities in source code according to an embodiment of the present invention. In the present embodiment, it is assumed that each vulnerability is associated with a different mitigable node. In other words, each mitigable node is associated with a single tainted path.

Referring to FIG. 3 along with the components in FIG. 1, the processor 110 loads paths and nodes by applying source code analysis techniques such as definite assignment analysis on source code (Step S301) and identifies at least one tainted path by enabling a plurality of vulnerability rules through a complete scan of the source code (Step S303). Similar to the previous embodiment, Step S301 and S303 may be done by employing one of the existing automated data flow analysis tools mentioned in the previous embodiment. For each vulnerability, the processor 110 needs to find a suitable sanitization method that may be applied for each mitigable node, referred to as a "target node" hereinafter. Based on the type of the vulnerability, the processor 110 may conduct a forward traversal or a backward traversal on the at least one tainted path by following the tainted inputs of all computations encountered throughout the at least one tainted path.

To be more specific, the processor 110 determines if the vulnerability is one of a SQL injection, a OS command injection, a LDAP injection, an XML injection, or an XPath injection (Step S305). The OS command injection is an escape string or format string attack that occurs when unsanitized user input is passed to a system shell. The LDAP injection is an attack used to exploit web based applications that construct LDAP statements based on user input. The XML injection is a XML tag in a simple object access protocol (SOAP) message aiming at modifying the XML structure. Typical examples are modification of payment data and unauthorized administration login. The XPath injection is an attack when a website uses user-supplied information to construct an XPath query for XML data. Similar to the SQL injection, the hackers may exploit such vulnerability with a command sequence appended to the appropriate format or escape string to execute arbitrary commands. When a software application fails to properly sanitize user input, it is possible to modify commands or statements using a local proxy. A successful injection may result in the execution of arbitrary commands or restricted operations such as elevating the privileges, granting permission to unauthorized queries and content modification. If the vulnerability is determined to be one of the SQL injection, the OS command injection, the LDAP injection, the XML injection, or the XPath injection, the processor 110 locates the first node containing a tainted object (referred to as a first forward node) as the target node along each of the at least one tainted path from the source to the sink (Step S307). That is, among all the nodes containing the tainted inputs identified by the processor 110, the first forward node is tainted directly from a pure external source (injection) but not inherited from its parent node. On the other hand, if the vulnerability is determined to be other than the SQL injection, the OS command injection, the LDAP injection, the XML injection, or the XPath injection, the processor 110 locates the first node containing the tainted object (referred to as a first backward node) as the target node along each of the at least one tainted path from the sink to the source (Step S312).

After the target node is located, the processor 110 determines if the actual object/variable exists in the target node (Step S308 or Step S314). If the actual object/variable does not exist in the target node, the processor 110 sets a next node as the target node (Step S310 or Step S316) and repeats Step S308 or Step S314 respectively. That is, if the vulnerability is one of the SQL injection, the OS command injection, the LDAP injection, the XML injection, or the XPath injection, the processor 110 may locate the second node containing the tainted object as a new target node from the source to the sink (Step S310) for ensuring that the tainted object in the target node is not inherited from its parent node; otherwise, the processor 110 may locate the second node containing the tainted object as a new target node from the sink to the source (Step S316).

If the actual object/variable exists in the target node, the processor 110 determines that the current target node is mitigable and applies an instant-fix call at the actual tainted object on the target node based on the corresponding vulnerability rule (Step S317). The instant-fix call is configured to amend the injection code based on the provided vulnerability rule by using an existing vulnerability analysis tool in conjunction with the knowledge that the database 135 has accumulated over time in handling specific vulnerabilities in the past. In one of exemplary embodiments, the processor 110 may assign a confidence score (e.g. 0-3) for each instant-fix call as a future reference. Moreover, the processor 110 creates a copy of amended source code according to the instant-fix call.

Next, the processor 110 may compile the copy of amended source code and check if the copy of amended source code is compilable (Step S319). If the copy of amended source code is compilable, the processor 110 determines that the amendment is legal, writes the target node and the corresponding amendment into the database 135 for references in the future (Step S321), and ends the algorithm. If the copy of amended source code is not compilable, the processor 110 determines that the amendment is illegal and returns to Step S310 or Step S316 for another identification of a new target node until the mitigation is completed.

Figure 4:
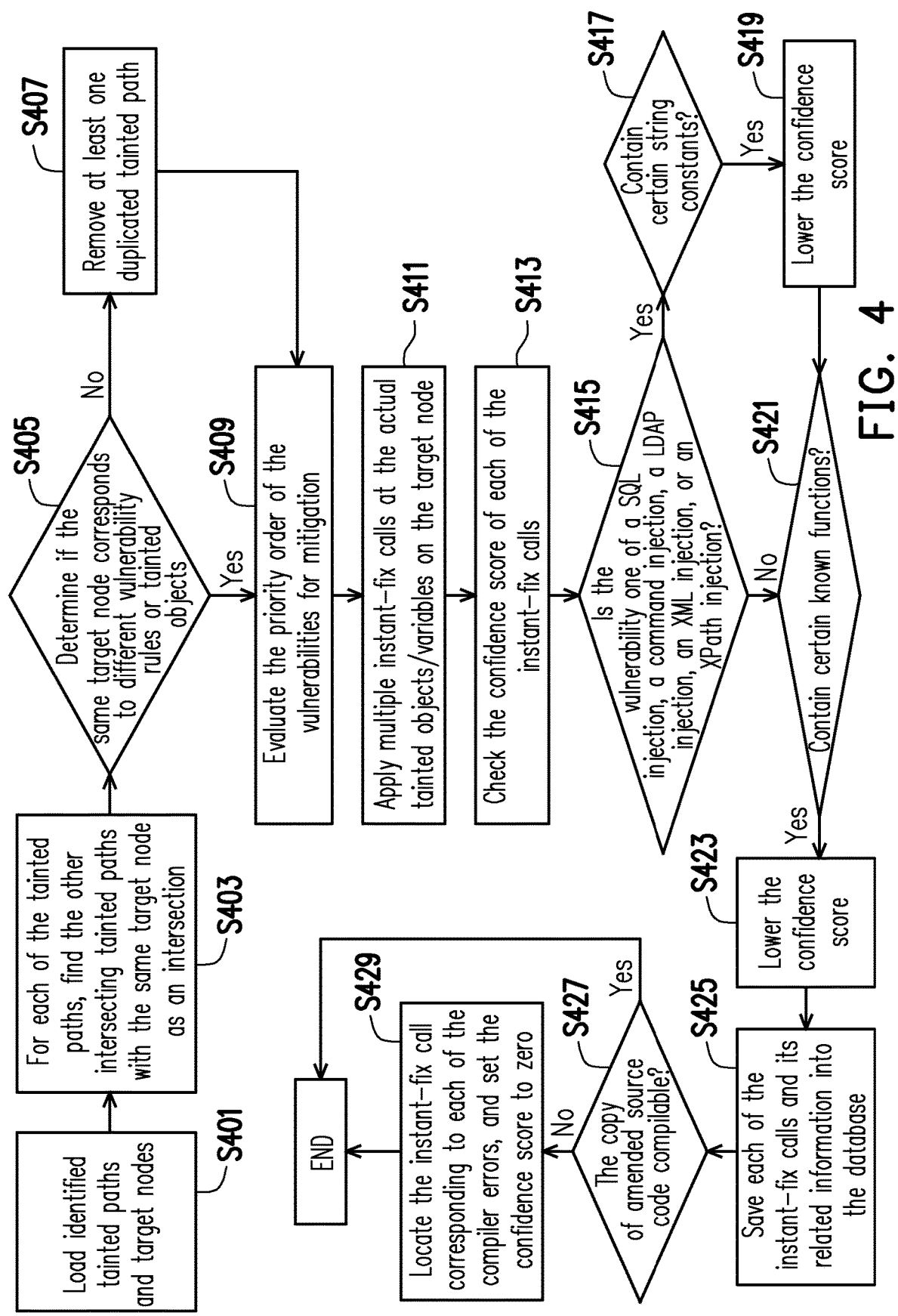
FIG. 4 is a flowchart illustrating an algorithm for automatically mitigating vulnerabilities in source code according to another embodiment of the present invention.

FIG. 4 is a flowchart illustrating an algorithm for automatically mitigating vulnerabilities in source code according to another embodiment of the present invention. In the present embodiment, it is assumed that more than one vulnerabilities are associated with a same mitigable node. In other words, each mitigable node is an intersection of multiple tainted paths.

Referring to FIG. 4, the processor 110 loads identified tainted paths and target nodes by enabling a plurality of vulnerability rules (Step S401). It is noted that such process may be done by leveraging the algorithm in FIG. 3, which will not be repeated hereinafter. For each of the tainted paths, the processor 110 may find the other intersecting tainted paths with the same target node as an intersection (Step S403). The processor 110 determines if the same target node corresponds to different vulnerability rules or tainted objects (Step S405). If the same target node corresponds to the same vulnerability rule or the same tainted object, the processor 110 may then remove at least one duplicated tainted path (Step S407). If the same target node corresponds to different vulnerability rules or different tainted objects, the processor may skip Step S407. For the same target node corresponds to different vulnerability rules or different tainted objects, the processor 110 may evaluate the priority order of the vulnerabilities for mitigation by the vulnerability rules (Step S409), which may define actual objects/variables on the target node and determine an optimal order to mitigate the vulnerability accordingly. Similar to Step S317, the processor 110 then may apply multiple instant-fix calls at the actual tainted objects/variables on the target node based on the corresponding vulnerability rule (Step S411).

Furthermore, the processor 110 may check the confidence score of each of the instant-fix calls (Step S413). In some embodiments, the processor 110 may choose not to apply the instant-fix calls with low confidence scores. The processor 110 may also adjust the confidence score at this point. First, the processor 110 determines if the vulnerability is one of the SQL injection, the OS command injection, the LDAP injection, the XML injection, or the XPath injection (Step S415). If the vulnerability is one of the SQL injection, the OS command injection, the LDAP injection, the XML injection, or the XPath injection, the processor 110 checks if the injection contains certain string constants (Step S417). If the injection contains certain string constants, the processor 110 may lower the confidence score of the corresponding instant-fix call (Step S419). If the vulnerability is not any one of the SQL injection, the OS command injection, the LDAP injection, the XML injection, or the XPath injection, the processor may skip Step S417 and directly proceeds to Step S421. In Step S421, the processor checks if the injection contains certain known functions. If the injection contains certain known functions, the processor 110 may lower the confidence score of the corresponding instant-fix call (Step S423) and save each of the instant-fix call and its related information into the database 135 (Step S425). It is noted that, if the injection does not contain certain known functions, the processor 110 may skip Step S423. Take the SQL injection as an example. The certain string constants may be concatenated with existing SQL commands, or the certain known functions may be meaningful SQL commands. As long as injected SQL code is syntactically correct, the processor 110 may not easily detect programmatically. Therefore, the processor 110 may need to validate the resulting instant-fix calls with a more careful review. In other words, the resulting instant-fix calls may be less reliable and receive lower confidence scores.

Next, the processor 110 may compile the copy of amended source code and check if the copy of amended source code is compilable (Step S427). If the copy of amended source code is compilable, the processor 110 determines that the amendment is legal and ends the algorithm. If the copy of amended source code is not compilable, the processor 110 locates the instant-fix call corresponding to each of the compiler errors, which means that the amendment is not reliable, sets the confidence score to zero (Step S429) and ends the algorithm. It is noted that, before the processor 110 applies the instant-fix call, it may first check the corresponding confidence score and make an adjustment based on the confidence score. In one of exemplary embodiments, such adjustment may be authenticated by the user manually.

By leveraging the algorithms presenting in the embodiments of FIG. 3 and FIG. 4, the system 100 in the present invention may automatically mitigate security issues in source code. In one of exemplary embodiments, when a user attempts to visit a website, the processor 110 of the system 100 may be initiated by one of the I/O facilities 140 such as a mouse click from the user, and first goes through the source code of the website. Then, the processor 110 finds the problems hackers may possibly exploit and then rewrite the source code to fix the problems. The user may then either verify and apply the fixes individually, or deploy the secured source code for immediate remediation.

Figure 5:
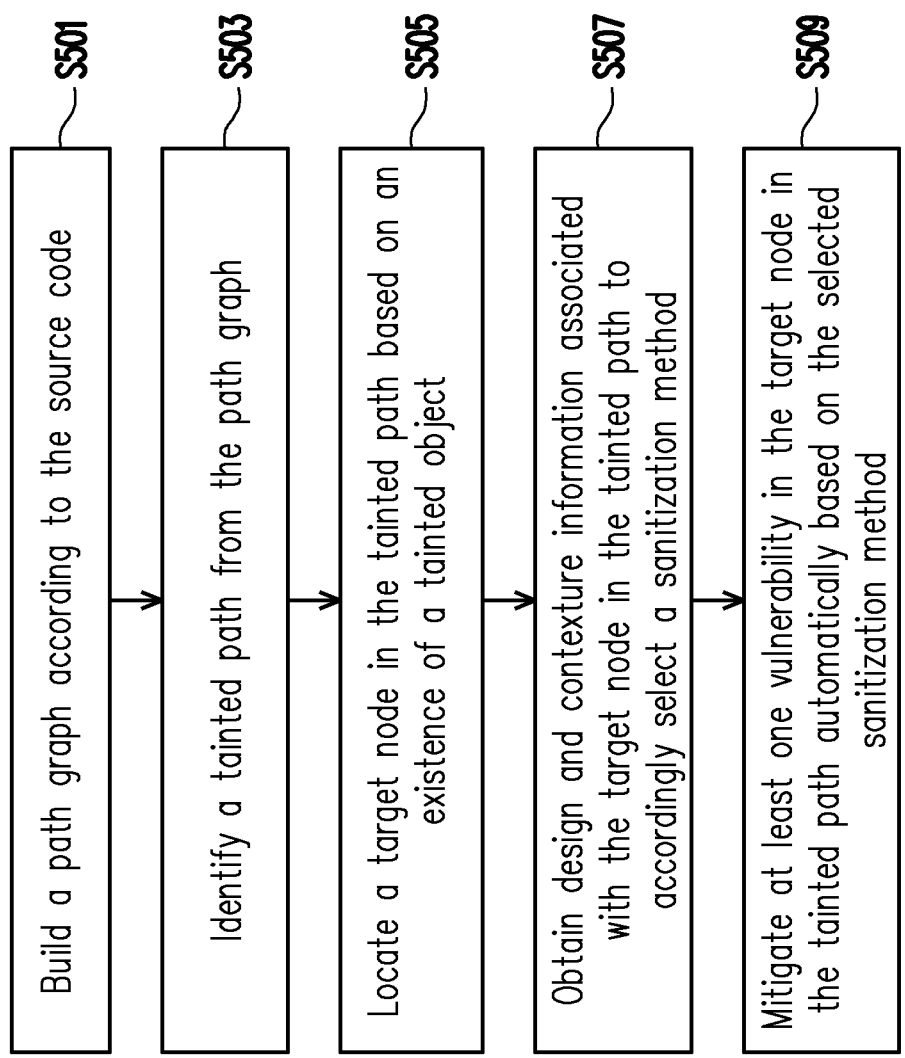
FIG. 5 is a flowchart illustrating an algorithm for automatically mitigating vulnerabilities in source code according to another embodiment of the present invention.

FIG. 5 is a flowchart illustrating an algorithm for automatically mitigating vulnerabilities in source code according to another embodiment of the present invention.

Referring to FIG. 5 along with the components in FIG. 1, the method for automatically mitigating vulnerabilities in source code including the following steps. First, the processor 110 builds a path graph according to the source code (Step S501) and identifies at least one tainted path corresponding to a vulnerability from the path graph (Step S503). Similar to the previous embodiments, the path graph includes paths traversing from a sink to a source, and each of the paths include nodes. For simplicity purpose, the number of tainted paths would be described in singular herein, and yet the other embodiments the number of tainted paths may be in plural.

Next, the processor 110 locates a target node in the tainted path based on an existence of a tainted object (Step S505). Assume that the identified tainted path is defined as "a first tainted path" and includes "first nodes". The processor 110 may identify the first node with a maximum confidence score associated with an instant-fix call and set such node as the target node in the first tainted path.

In an embodiment, the processor 110 may apply the instant-fix call at the tainted object on each of the first nodes of the first tainted path and set a confidence score corresponding to each of the first nodes. Next, the processor 110 may set the first node with the maximum confidence score as the target node in the first tainted path. In the case where two or more first nodes having the same maximum confidence score, the processor 110 may set the one that is closest to the sink as the target node in the first tainted path. For example, FIG. 6A illustrates a schematic diagram of a first tainted path in accordance with an embodiment of the present invention. The processor 110 may perform traversal from a sink node 611 all the way to a source node 620. Assume that the range of confidence score is 0-3. Once the traversal completes, suppose that a node 615 has a maximum confident score (e.g. 3) among all the nodes in the first tainted path. The processor 110 would set the node 615 as a target node of the first tainted path.

In another embodiment, the processor 110 may apply the instant-fix call at the tainted object starting from the sink node. Assume that the currently processed node is defined as "a current node". The processor 110 may apply the instant-fix call at the current node and set a confidence score corresponding to the current node. Next, the processor 110 may determine whether the confidence score of the current node is equal to an upper bound value. If the determination is affirmative, the processor 110 would set the current node as the target node and stop traversing. If the determination is negative, the processor 110 would set a next node as the current node, apply the instant-fix call at the new current node, and set a confidence score corresponding to the new current node in a similar fashion. As an example of FIG. 6A, the processor 110 may perform traversal from the sink node 611. When the traversal reaches the node 615 and its confident score meets the upper bound (i.e. 3), the processor 110 may terminate the traversal and set the node 615 as the target node of the first tainted path.

In the case where multiple tainted paths exist, for example, a second tainted path having second nodes are identified, when the first tainted path and the second tainted path share the same target node, the processor 110 would adjust the previously-set confidence score of the target node with respect to the first tainted path according to the confidence score of the target node with respect to the second tainted path. Once the confidence score of the target node with respect to the first tainted path has been changed, the processor 110 would re-determine the first node with the maximum confidence score as a new target node in the first tainted path.

Figure 6B:
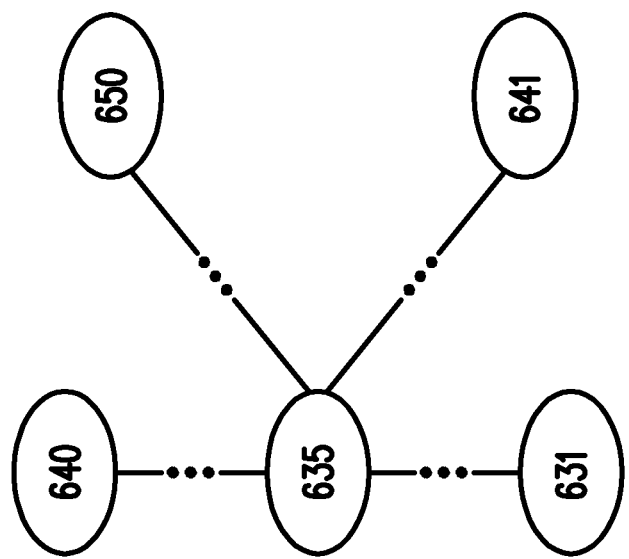
FIG. 6B illustrates a schematic diagram of a first tainted path and a second tainted path in accordance with an embodiment of the present invention.
Figure 6A:
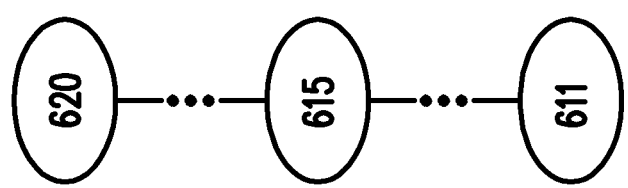
FIG. 6A illustrates a schematic diagram of a first tainted path in accordance with an embodiment of the present invention.

For example, FIG. 6B illustrates a schematic diagram of a first tainted path and a second tainted path in accordance with an embodiment of the present invention, where a node 635 is a target node of both tainted paths. Assume that confident scores of the node 635 are 3 and 2 with respect to the first tainted path and the second tainted path. The processor 110 may lower the confident score of the node 635 with respect to the first tainted path by, for example, amending its value from 3 to 2, or from 3 to 2.5 (an average of 3 and 2). The processor 110 may re-evaluate the target node in the first tainted path based on the amended confidence score.

For example, a node 640 with a confidence value of 3 is not originally considered as a target node since the node 635 is closer to the sink, whereas the node 640 would be determined as the new target node after the amendment on the confidence score of the node 635 is made.

Referring back to FIG. 5, once the target node is identified, the processor 110 obtains design and contextual information associated with the target node in the tainted path to accordingly select a sanitization method (Step S507) and mitigate at least one vulnerability in the target node in the tainted path automatically based on the selected sanitization method (Step S509). In detail, suppose that the tainted paths include a target tainted path. The processor 110 may perform one or more analyses on the target tainted path to obtain the design and contextual information associated with the target node to accordingly select the sanitization method from a list of possible sanitization methods. The analyses may include data flow analysis, vector analysis, lexical analysis, and graph analysis. The design and contextual information may direct to a vulnerability rule, an attack vector, context of the target tainted path, and the possible sanitization methods may correspond to different types of security coding methods.

For better comprehension, Table 1 to Table 3 respectively illustrate three examples where original vulnerable codes and different sanitization methods are provided.

Table 1 illustrates an example of SQL injections from web requests with and without malicious string replacement being in-place. In Scenario 1, since some potential malicious strings are able to be filtered out by a function query=query. Replace (""", "") in a data flow, a sanitization method SqlEncodeLite may be applied. In Scenario 2, since no particular prevention function is applied, a normal sanitization method SqlEncode, a relatively stronger tool than SqlEncodeLite, may be applied.

TABLE 1

Example 1 (Malicious string replacement in-place)
Vector = web request
Rule = SQL Injection

|  | Scenario 1 | Scenario 2 |
|---|---|---|
| Original Vulnerable Code | var query = Request["query"];<br>query = query.Replace(""", "");<br>sqlCmd.ExecuteQuery("SELECT * FROM [Table] WHERE [Keyword] = '" + query + "'"); | var query = Request["query"];<br>sqlCmd.ExecuteQuery("SELECT * FROM [Table] WHERE [Keyword] = '" + query + "'"); |
| Fix Code | var query = Request["query"];<br>query = query.Replace(""", "");<br>sqlCmd.ExecuteQuery("SELECT * FROM [Table] WHERE [Keyword] = '" + SqlEncodeLite(query) + "'"); | var query = Request["query"];<br>sqlCmd.ExecuteQuery("SELECT * FROM [Table] WHERE [Keyword] = ""'" + SqlEncode(query) + """"); |

Table 2 illustrates an example of SQL injections from web requests, where potentially malicious objects were injected into different parts of SQL queries. In Scenario 1, since a potentially malicious object ("name") is used as a query value in the SQL statement, the source code would be secured by passing the object along with the SQL statement as a parameter (also known as "parameterized query") so as to prevent the user input from being embedded in the statement. In Scenario 2, since the potentially malicious object ("department") is used as a table name in the SQL statement, it would not be able to be passed along as a parameter but would require to be sanitized by using a sanitization method before embedded in the statement.

TABLE 2

Example 2 (Parameterized Query)
Vector = web request
Rule = SQL Injection

| | Scenario 1 | Scenario 2 |
|---|---|---|
| Original Vulnerable Code | string name = txtName.Text;<br>MySqlCommand cmd = new MySqlCommand("select email from Employees where firstName = """ + name +"""", connection); | string department = txtDepartment.Text;<br>MySqlCommand cmd = new MySqlCommand("select email from [" + department + "]", connection); |
| Fix Code | string name = txtName.Text;<br>MySqlCommand cmd = new MySqlCommand("select email from Employees where firstName = @name", connection);<br>cmd.Parameters.AddWithValue("@name", name); | string department = txtDepartment.Text;<br>MySqlCommand cmd = new MySqlCommand("select email from [" + SqlEncode(department) + "]" connection); |

Table 3 illustrates an example of missing encryption of sensitive data with and without additional attributes. In Scenario 1, since the detected data is confidential social security number (SSN) information, an additional nationality decryption restriction may be set in addition to applying an ordinary encryption. In Scenario 2, since no extreme sensitive data is detected, an ordinary encryption approach may be applied without any additional decryption restriction.

TABLE 3

Example 3 (Encryption of Sensitive Data)
Vector = sensitive data
Rule = missing encryption of sensitive data

| | Scenario 1 | Scenario 2 |
|---|---|---|
| Original Vulnerable Code | var ssnTextBox = new System.Web.UI.WebControls.TextBox( );<br>var ssn = ssnTextBox.Text;<br>db.Persons.Find(person).Ssn = ssn; | var emailTextBox = new System.Windows.Controls.TextBox( );<br>var email = emailTextBox.Text;<br>db.Persons.Find(person).Email = email; |
| Fix Code | var ssnTextBox = new System.Web.UI.WebControls.TextBox( );<br>var ssn = ssnTextBox.Text;<br>AesCryptoProvider aesCryptoProvider = new AesCryptoProvider(key, iv, salt);<br>var encryptedSsn = aesCryptoProvider.Encrypt(ssn);<br>db.Persons.Find(person).Ssn = new Ssn(encryptedSsn) { Source = Source.Web, Nationality = Country.US }; | var emailTextBox = new System.Windows.Controls.TextBox( );<br>var email = emailTextBox.Text;<br>AesCryptoProvider aesCryptoProvider = new AesCryptoProvider(key, iv, salt);<br>var encryptedEmail = aesCryptoProvider.Encrypt(email);<br>db.Persons.Find(person).Email = new Email(email); |

As a side note, in some implementations, the processor 110 may further select the sanitization method from possible sanitization methods according to user settings based upon the actual needs. For example, the user may wish to protect email information as sensitive information. An additional restriction (e.g. IP location) may be set and specified besides an ordinary encryption. Moreover, a priority order for sanitization may be preset by the user based on vulnerability rule, attack vector, context as well. Therefore, when multiple tainted paths exist in the path graph, the processor 110 may mitigate the vulnerability in the target node in each tainted path sequentially based on the priority order.

In other implementations, the processor 110 may select one or more sanitization methods from possible sanitization methods based upon whether a same target node is shared by multiple tainted paths. In detail, FIG. 7 is a flowchart illustrating an algorithm for automatically mitigating vulnerabilities in source code according to another embodiment of the present invention.

Figure 7:
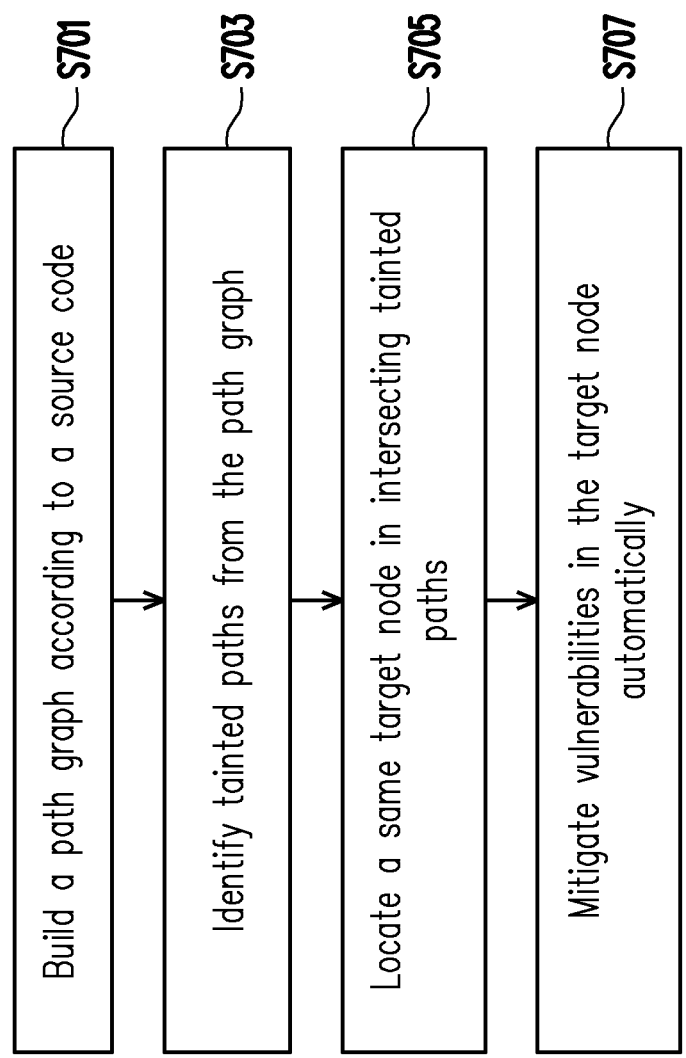
FIG. 7 is a flowchart illustrating an algorithm for automatically mitigating vulnerabilities in source code according to another embodiment of the present invention.

Referring to FIG. 7 along with the components in FIG. 1, the method for automatically mitigating vulnerabilities in a source code including the following steps. First, the processor 110 builds a path graph according to the source code (Step S701) and identifies tainted paths from the path graph (Step S703). Herein, the path graph includes paths, and each of the paths include nodes, and each of the tainted paths corresponds to a vulnerability.

Next, the processor 110 locates a same target node in multiple intersecting tainted paths among the tainted paths based on an existence of a tainted object (Step S705). In other words, the target node herein is a node with a tainted object that is shared by the intersecting tainted paths. Once the target node is located, the processor 110 mitigates vulnerabilities in the target node automatically (Step S709). In the present exemplary embodiment, the processor 110 may obtain sanitization methods correspond to the vulnerabilities in the target node and mitigate the vulnerabilities in the target node automatically by using either one of the sanitization methods or more than one of the sanitization methods in a priority order for sanitization.

In one embodiment where a same target node is shared by two or more intersecting tainted paths, the processor 110 may determine whether any single sanitization method among the sanitization methods (referred to as "a designated sanitization method" hereafter) is able to mitigate all of the vulnerabilities in the target node corresponding to all of the intersecting tainted paths. The determination may be based on a prestored referential list or dynamically determined. If the determination is affirmative, the processor 110 may mitigate all of the vulnerabilities in the target node corresponding to all of the intersecting tainted paths by only using the designated sanitization method to avoid redundancy.

For example, suppose that the intersecting tainted paths include a first tainted path and a second tainted path that share a same target node, and suppose that the sanitization methods include a first sanitization method corresponding to the first tainted path and a second sanitization method corresponding to the second tainted path. The processor 110 may determine whether the first sanitization method is able to mitigate both of the vulnerabilities in the target node corresponding to both the first tainted path and the second tainted path. If the determination is affirmative, the processor 110 may mitigate both of the vulnerabilities in the target node automatically by only using the first sanitization method to avoid redundancy. As a side note, if there exist other tainted paths that intersect with the first tainted path and the second tainted path at the target node, the processor 110 may determine whether the first sanitization method is able to mitigate vulnerabilities in the target node corresponding to the other tainted paths. If the processor 110 determines that at least one of the other tainted paths (referred to as "at least one first other tainted path" hereafter) is able to be mitigated by the first sanitization method, the processor 110 may also mitigate the vulnerability in the target node corresponding to the at least one first other tainted path by using the first sanitization method as well. In other words, when the number of the intersecting tainted paths is three or more, the processor 110 may mitigate the vulnerabilities in the target node corresponding to two or more of the intersecting tainted paths by using the same sanitization method.

For better comprehension, Table 4 illustrates an example of a SQL injection and an unprotected storage of credentials sharing a same web request as source. In Scenario 1, a sanitization method SqlEncode is used to remediate the SQL injection by escaping potentially malicious characters such as the single quote ("'"). In Scenario 2, a sanitization method HashPassword is used to remediate the information exposure by processing the credentials through a one-way hash. However, since the sanitization method HashPassword is capable of remediating both the SQL injection and the unprotected storage of credentials, all the vulnerabilities in a shared node may be mitigated by only using one single sanitization method.

In another embodiment, the processor 110 may mitigate the vulnerabilities in the target node by using more than one of the sanitization methods in a particular sequence according to a priority order for sanitization. In detail, suppose that the intersecting tainted paths include a first tainted path and a second tainted path that share a same target node, and suppose that the sanitization methods include a first sanitization method corresponding to the first tainted path and a second sanitization method corresponding to the second tainted path. Before mitigation is performed, the processor 110 may first obtain the priority order for sanitization. If the priority order for sanitization indicates that the first sanitization method is suggested to be performed prior to the second sanitization method, the processor 110 may mitigate the vulnerabilities in the target node by using the first sanitization method followed by the second sanitization method.

Herein, the priority order for sanitization may be preset based on a confidence score associated with an instant-fix call. In the preset stage of a priority order for sanitization, a confidence score associated with a first instant-fix call corresponding to the fist sanitization method as well as a second instant-fix call corresponding to the second sanitization method may be evaluated. A first confidence score of the target node corresponding to a first order for sanitization may be obtained, where the first order for sanitization is to apply the first instant-fix call followed by the second instant-fix call on the target node. Also, a second confidence score of the target node corresponding to a second order for sanitization may be obtained, where the second order for sanitization is to apply the second instant-fix call followed by the first instant-fix call on the target node. The processor 110 may compare the two confidence scores. If the first confidence score is higher than the second confidence score, the first order for sanitization may be set as the priority order for sanitization, and vice versa.

For better comprehension, Table 5 illustrates an example of an XML injection and an information exposure sharing the same external file as source. In Scenario 1, since the source contains certain sensitive strings (e.g. the greater-than and the lesser-than symbols), using a sanitization method for an XML injection, XmlEncode, may result in a lower confidence score. On the other hand, in Scenario 2, a sanitization method for an information exposure, EncryptPii, has a side-effect of safely removing such sensitive strings from a tainted object by encryption. Therefore, if the sanitization method EncryptPii is placed before the sanitization method XmlEncode, the confidence score for the resulting instant-fix call is not reduced.

TABLE 4

Example 4 (Remediating multiple vulnerabilities with single sanitization method)
Vector = web request
Rule = SQL Injection and Unprotected Storage of Credentials

|  | Scenario 1 | Scenario 2 |
|---|---|---|
| Original Vulnerable Code | var cred = Request["cred"];<br>sqlCmd.ExecuteQuery("UPDATE [Records] SET [Credentials] = '" + cred + "'"); | var cred = Request["cred"];<br>sqlCmd.ExecuteQuery("UPDATE [Records] SET [Credentials] = '" + cred + "'"); |
| Fix Code | var cred = Request["cred"];<br>sqlCmd.ExecuteQuery("UPDATE [Records] SET [Credentials] = '" + HashPassword(SqlEncode(cred)) + "'"); | var cred = Request["cred"];<br>sqlCmd.ExecuteQuery("UPDATE [Records] SET [Credentials] = '" + HashPassword(cred) + "'"); |

TABLE 5

Example 5 (Changing priority order to prevent the reduction of confidence score)
Vector = external file
Rule = XML Injection and Information Exposure

| | Scenario 1 | Scenario 2 |
|---|---|---|
| Original Vulnerable Code | var photoXml = "<photo>" + Request.File["photo"] + "</photo>"; xmlWriter.WriteRaw("<personnel>" + photoXml + "</personnel>"); | var photoXml = "<photo>" + Request.File["photo"] + "</photo>"; xmlWriter.WriteRaw("<personnel>" + photoXml + "</personnel>"); |
| Fix Code | var photo = "<photo>" + Request.File["photo"] + "</photo>"; xmlWriter.WriteRaw("<personnel>" + EncryptPii(XmlEncode(photoXml)) + "</personnel>"); | var photo = "<photo>" + Request.File["photo"] + "</photo>"; xmlWriter.WriteRaw("<personnel>" + XmlEncode(EncryptPii(photoXml)) + "</personnel>"); |

In one of exemplary embodiments, computer program products including a plurality of program instructions stored in a tangible computer medium implementing the functionality or method of this invention will commonly be non-volatile, hard-coded type media distributed to users on a distribution medium, such as floppy disks, read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links, or other computer-readable medium. The term "computer-readable medium" encompasses distribution media, intermediate storage media, execution memory of a computer, and any other medium or device capable of storing computer program instructions implementing the functionality or methods of embodiments of the present invention for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the algorithm or method of this invention. All such operations are well known to those skilled in the art of computer systems.

In summary, by leveraging static code analysis and data flow graphs, the present invention provides a method, a system, and a computer program product for automatically mitigating vulnerabilities in a source code. By going through the source code of applications, the vulnerabilities that hackers may exploit are able to be found, and then the source code are re-written to mitigate the vulnerabilities. The users may then either verify and apply the amendment individually or deploy the secured source code for immediate remediation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for automatically mitigating vulnerabilities in a source code of an application comprising:
building a path graph according to the source code, wherein the path graph comprises a plurality of paths, and wherein each of the paths comprises a plurality of nodes;
identifying a plurality of tainted paths from the path graph, wherein each of the tainted paths corresponds to a vulnerability;
locating a same target node in a plurality of intersecting tainted paths among the tainted paths based on an existence of a tainted object; and
mitigating a plurality of vulnerabilities in the target node automatically comprising:
obtaining a plurality of sanitization methods corresponding to the vulnerabilities in the target node; and
mitigating the vulnerabilities in the target node automatically, based on a determination of whether any one of the sanitization methods is able to mitigate all of the vulnerabilities in the target node corresponding to all of the intersecting tainted paths, by using either only one of the sanitization methods or more than one of the sanitization methods in a priority order for sanitization.

2. The method according to claim 1, wherein the step of mitigating the vulnerabilities in the target node automatically comprises:
determining whether a designated sanitization method among the sanitization methods is able to mitigate all of the vulnerabilities in the target node corresponding to all of the intersecting tainted paths; and
in response that the designated sanitization method is able to mitigate all of the vulnerabilities in the target node corresponding to all of the intersecting tainted paths, mitigating all of the vulnerabilities in the target node automatically by only using the designated sanitization method.

3. The method according to claim 1, wherein the intersecting tainted paths comprise a first tainted path and a second tainted path, wherein the sanitization methods comprise a first sanitization method corresponding to the first tainted path and a second sanitization method corresponding to the second tainted path, and wherein the step of mitigating the vulnerabilities in the target node automatically comprises:
determining whether the first sanitization method is able to mitigate both of the vulnerabilities in the target node corresponding to both the first tainted path and the second tainted path; and
in response that the first sanitization method is able to mitigate both of the vulnerabilities in the target node corresponding to both the first tainted path and the second tainted path, mitigating the vulnerabilities in the target node automatically by only using the first sanitization method.

4. The method according to claim 3, wherein the intersecting tainted paths further comprise a plurality of other tainted paths, and wherein the step of mitigating the vulnerabilities in the target node automatically further comprises:
   determining whether the first sanitization method is able to mitigate vulnerabilities in the target node corresponding to the other tainted paths; and
   in response that the first sanitization method is able to mitigate the vulnerability in the target node corresponding to at least one first other tainted path among the other tainted paths, mitigating the vulnerability in the target node corresponding to the at least one first other tainted path automatically by using the first sanitization method.

5. The method according to claim 1, wherein the step of mitigating the vulnerabilities in the target node automatically comprises:
   obtaining the priority order for sanitization; and
   mitigating the vulnerabilities in the target node automatically by using more than one of the sanitization methods in sequence according to the priority order for sanitization.

6. The method according to claim 1, wherein the intersecting tainted paths comprise a first tainted path and a second tainted path, wherein the sanitization methods comprise a first sanitization method corresponding to the first tainted path and a second sanitization method corresponding to the second tainted path, and wherein the step of mitigating the vulnerabilities in the target node automatically comprises:
   obtaining the priority order for sanitization; and
   mitigating the vulnerabilities in the target node automatically by using the first sanitization method and the second sanitization method in sequence according to the priority order for sanitization.

7. The method according to claim 6, wherein before the step of obtaining the priority order for sanitization, the method further comprises:
   setting the priority order for sanitization based on user settings.

8. The method according to claim 6, wherein before the step of obtaining the priority order for sanitization, the method further comprises:
   setting the priority order for sanitization based on a confidence score associated with a first instant-fix call corresponding to the first sanitization method and a second instant-fix call corresponding to the second sanitization method.

9. The method according to claim 8, wherein the step of setting the priority order for sanitization based on the confidence score associated with the first instant-fix call corresponding to the first sanitization method and the second instant-fix call corresponding to the second sanitization method comprises:
   obtaining a first confidence score of the target node corresponding to a first order for sanitization, wherein the first order for sanitization is to apply the first instant-fix call followed by the second instant-fix call on the target node;
   obtaining a second confidence score of the target node corresponding to a second order for sanitization, wherein the second order for sanitization is to apply the second instant-fix call followed by the first instant-fix call on the target node;
   setting the first order for sanitization as the priority order for sanitization in response to the first confidence score being higher than the second confidence score; and
   setting the second order for sanitization as the priority order for sanitization in response to the second confidence score being higher than the first confidence score.

10. A system for automatically mitigating vulnerabilities in a source code of an application comprising:
    a memory;
    a processor, coupled to the memory and configured to:
       build a path graph according to the source code, wherein the path graph comprises a plurality of paths, and wherein each of the paths comprises a plurality of nodes;
       identify a plurality of tainted paths from the path graph, wherein each of the tainted paths corresponds to a vulnerability;
       locate a same target node in a plurality of intersecting tainted paths among the tainted paths based on an existence of a tainted object; and
       mitigate a plurality of vulnerabilities in the target node automatically comprising:
          obtain a plurality of sanitization methods corresponding to the vulnerabilities in the target node; and
          mitigate the vulnerabilities in the target node automatically, based on a determination of whether any one of the sanitization methods is able to mitigate all of the vulnerabilities in the target node corresponding to all of the intersecting tainted paths, by using either only one of the sanitization methods or more than one of the sanitization methods in a priority order for sanitization.

11. A non-transitory computer-readable medium comprising a plurality of program instructions, which when executed by a computer system, cause the computer system to execute steps of:
    building a path graph according to the source code, wherein the path graph comprises a plurality of paths, and wherein each of the paths comprises a plurality of nodes;
    identifying a plurality of tainted paths from the path graph, wherein each of the tainted paths corresponds to a vulnerability;
    locating a same target node in a plurality of intersecting tainted paths among the tainted paths based on an existence of a tainted object; and
    mitigating a plurality of vulnerabilities in the target node automatically mitigating a plurality of vulnerabilities in the target node automatically comprising:
       obtaining a plurality of sanitization methods corresponding to the vulnerabilities in the target node; and
       mitigating the vulnerabilities in the target node automatically, based on a determination of whether any one of the sanitization methods is able to mitigate all of the vulnerabilities in the target node corresponding to all of the intersecting tainted paths, by using either only one of the sanitization methods or more than one of the sanitization methods in a priority order for sanitization.

* * * * *